Feb. 9, 1960 L. E. PACKARD ET AL 2,924,718
RADIOACTIVITY MEASURING APPARATUS
Filed April 10, 1959 4 Sheets-Sheet 1

Inventors.
Lyle E. Packard
William S. Scott
Emerson B. Mason
Charles E. Soderquist
By
Wolfe, Hubbard, Voit & Osann
Attys.

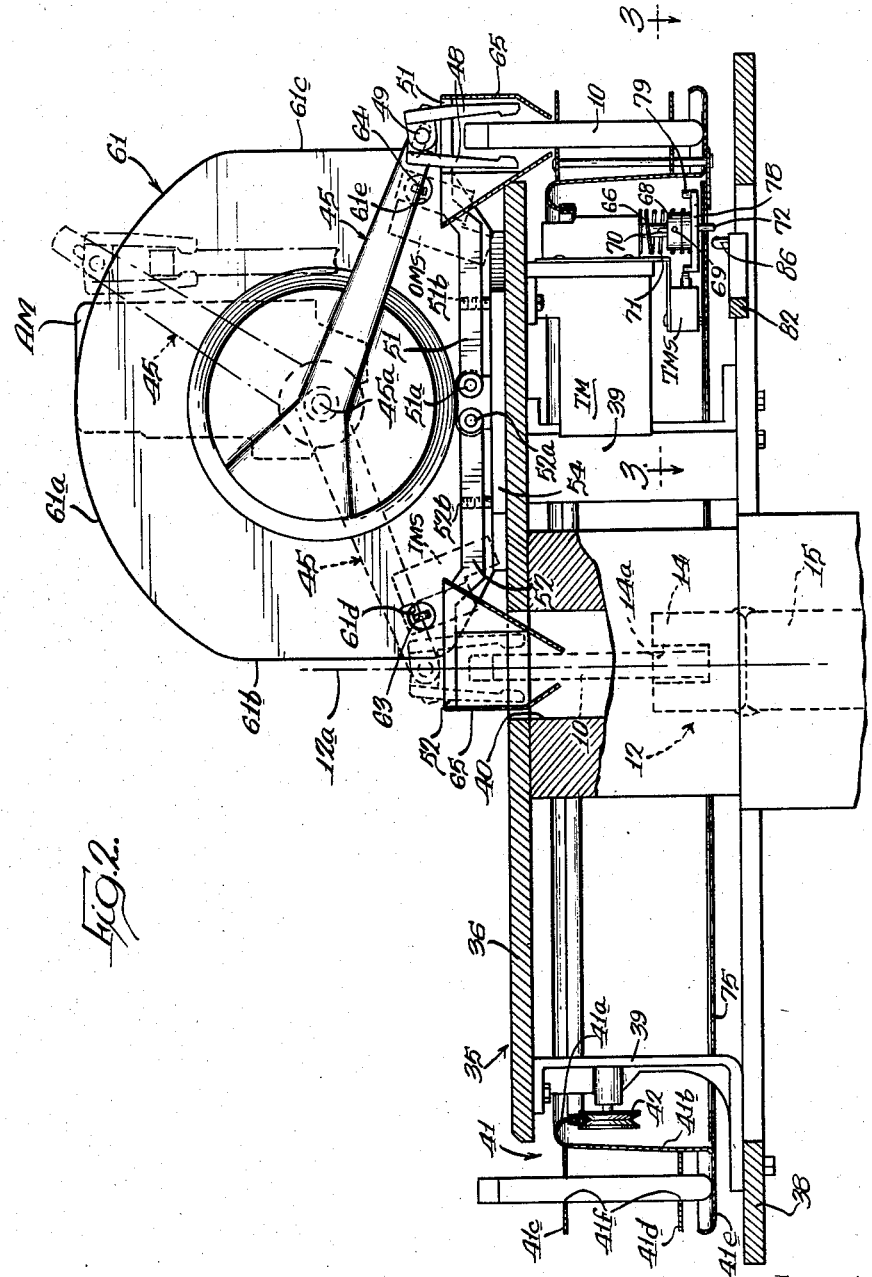

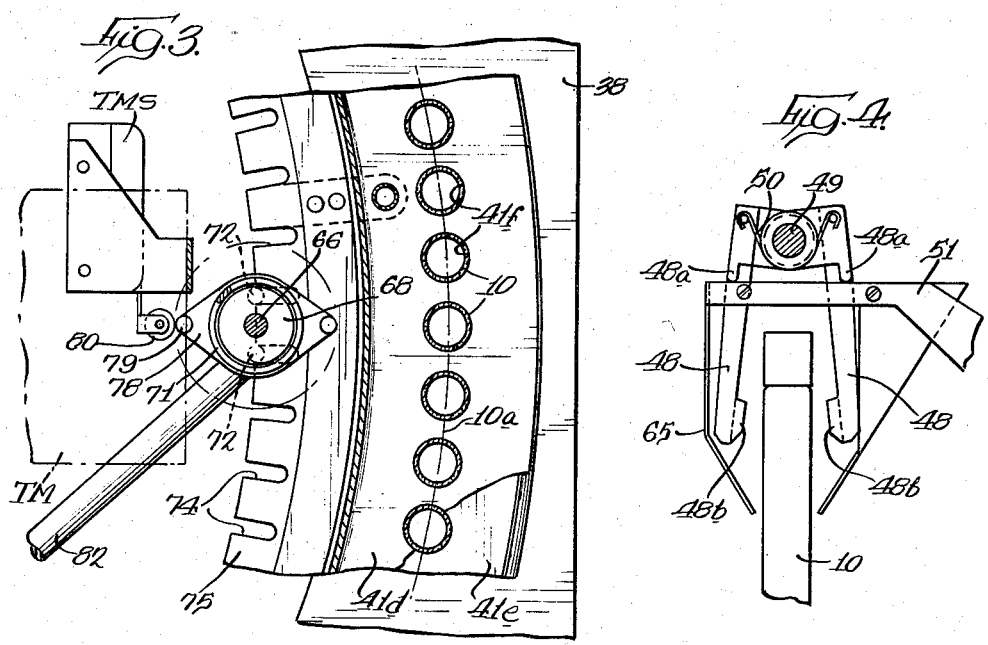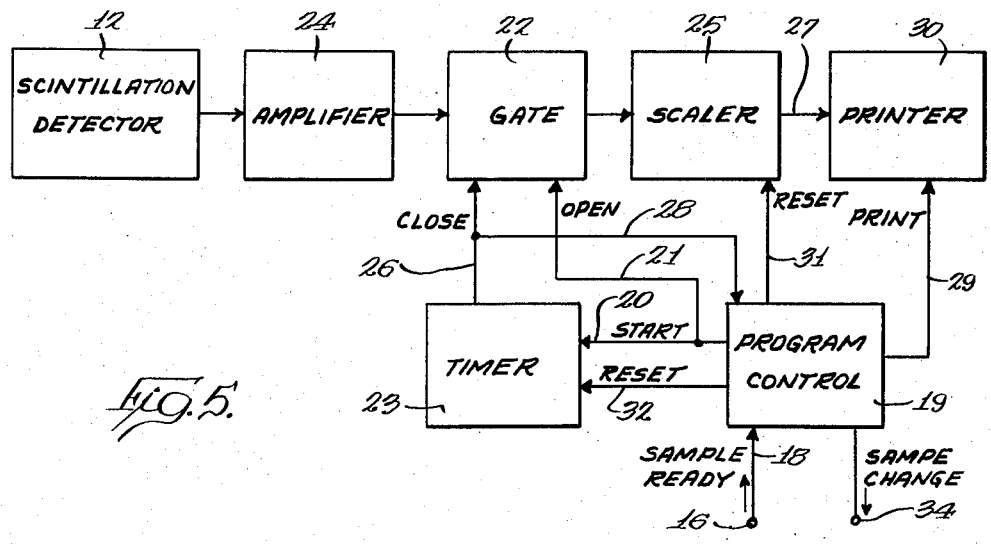

United States Patent Office 2,924,718
Patented Feb. 9, 1960

2,924,718

RADIOACTIVITY MEASURING APPARATUS

Lyle E. Packard, William S. Scott, and Emerson B. Mason, Western Springs, and Charles E. Soderquist, Chicago Heights, Ill., assignors to Packard Instrument Company, Inc., La Grange, Ill., a corporation of Illinois Application April 10, 1959, Serial No. 805,403

18 Claims. (Cl. 250—71.5)

This invention relates in general to apparatus for measuring radioactivity, and in particular to apparatus which successively and automatically measures the radioactive strengths of a relatively large number of samples or specimens.

The general aim of the invention is to enhance the precision of such apparatus by reducing or eliminating variations in the background radiation received by a detector as successive samples are placed therein.

More specifically, it is an object of the invention to keep the background radiation reaching a detector from stored radioactive samples substantially constant by maintaining a uniform spacing between each stored sample and the detector as individual samples are placed in the detector.

A related object is to reduce the shielding required around a radiation detector without sacrifice in the accuracy of radiation measurements.

Still another object is to provide an improved and highly reliable mechanism for automatically transferring radioactive samples successively from a storage support or tray to a radiation detector and back again.

In this connection, it is another object to transfer samples successively from a storage support to a detector and back, while keeping such samples always vertically disposed. This is particularly advantageous where the samples take the form of test tubes containing liquids with radioactive isotopes therein. A related object is to move a sample straight into or out of a closely fitting opening in a detector or tray, so as to eliminate binding.

A further object of the invention is to achieve automatic pick-up and release of samples in response to a transfer member moving from or reaching two limit positions.

Still another object is to provide for reliable sequencing in transferring a sample from a storage tray to a radiation detector, measuring the radiation strength of the sample, returning it to the storage tray, and then relatively angularly indexing the storage tray and transfer mechanism so that another sample may be next moved to the detector.

Other objects and advantages will become apparent as the following description proceeds, taken in conjunction with the accompanying drawings, in which:

Fig. 2 is a vertical section taken substantially along the line 2—2 in Fig. 1;

Fig. 3 is a fragmentary detail view taken in section substantially along the line 3—3 in Fig. 2, and illustrating the drive for angularly indexing a sample support or turntable;

Fig. 4 is a detail view taken substantially along the line 4—4 in Fig. 1 and showing the construction of sample-gripping jaws and actuating means therefor;

Fig. 5 is a block diagram of an electrical system which accepts, counts and records the output of a detector.

Figure 1:
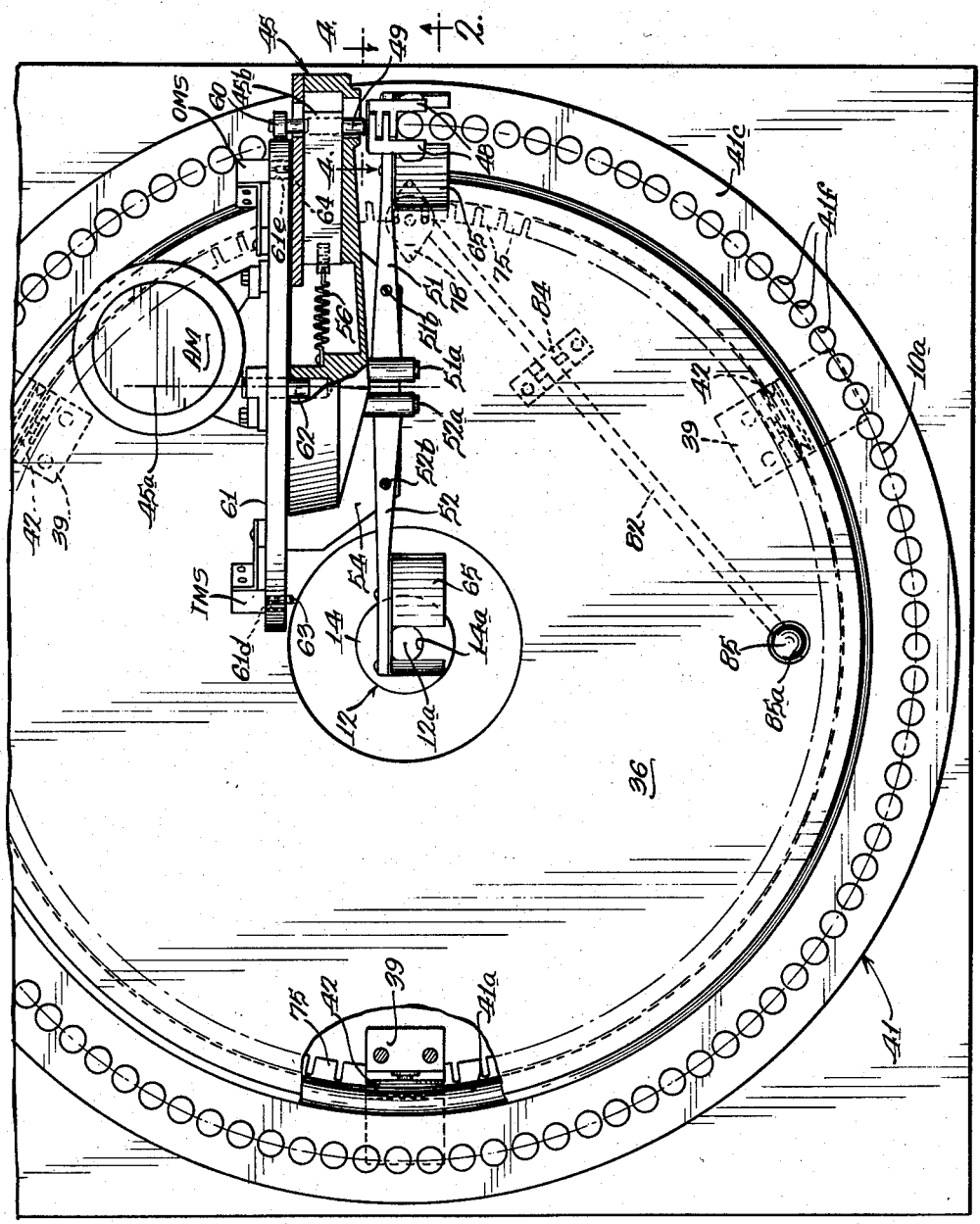
Figure 1 is a plan view, partially in section, of radiation measuring apparatus embodying the features of the invention.

While the invention has been shown and will be described in some detail with reference to a particular embodiment thereof, there is no intention that it thus be limited to such detail. On the contrary, it is intended here to cover all modifications, alternative constructions and equivalents falling within the spirit and scope of the invention as defined by the appended claims.

Referring now to the drawings, the exemplary apparatus is intended to measure and indicate the strength or amount of radioactive material contained within each of a plurality of specimens or samples. As here shown, such samples take the form of elongated test tubes 10 which contain, for example, liquid solutions of organic chemicals taken from some organism after the latter has been treated with a radioactive tracer. In scientific research and medical diagnosis, it is often necessary to measure and record the relative radiation strengths of a great number of samples taken from different locations and at different times. The present apparatus is intended to automatically measure and record the radioactive strengths of a large number of samples, thereby eliminating the time-consuming task of manually manipulating each during a measurement process.

While the invention is not limited in its application to measuring any one type of radioactive material, it will be assumed in connection with the present description that the samples 10 contain gamma ray emitting isotopes. Gamma radiation is not appreciably absorbed by ordinary solid materials, and effective shielding must be made of relatively thick and heavy metal.

In carrying out the invention, a single radiation detector 12 is employed, and is here shown as a gamma-sensitive scintillation crystal 14 having a downward opening 14a in the top surface thereof. The crystal 14 may be, for example, thallium-activated sodium iodine housed in an aluminum can. To detect and electrically signal light flashes in the crystal 14, its base is joined to a photomultiplier tube 15. As is well known, gamma particles emitted by disintegration of an atomic nucleus of an unstable isotope produce light pulses in the crystal 14. These light pulses are translated by the photomultiplier tube 15 into voltage pulses. The intensity of a light pulse and the amplitude of the corresponding voltage pulse depends upon the energy level of the gamma particles, and thus upon the particular isotope which is present in the sample. The average frequency or rate of such pulses, however, is a measure of the amount of the radioactive isotope in the sample, i.e., what is here termed the radioactive strength.

Referring for the moment to Fig. 5, the scintillation detector 12 is associated with apparatus which counts and indicates the total number of gamma particles received during a predetermined time interval from a given sample. After a sample 10 has been placed in the detector, a signal is received on a terminal 16 (as explained more fully below) and passed over a line 18 to a program control 19. This signal indicates that a sample is "ready" for measurement. In response to such signal, the program control 19 passes a signal over lines 20 and 21 to open a gate 22 and start operation of a timer 23. During the predetermined interval measured off by the timer 23, voltage pulses produced by the detector 12 are passed through an amplifier 24 and the open gate 22 to a scaler 25. At the end of the timed period, the timer supplies a signal over lines 26 and 28 to respectively close the gate 22 and indicate to the program control 19 that counting has been completed. In response to the signal received over line 28, the program control 19 first supplies an actuating signal over a line 29 to a printer 30. The latter is coupled to the scaler 25 by a channel 27 and thus prints out on a paper tape or the like the reading of the scaler 25. Following such read-out by the printer 30, the program control 19 supplies signals over lines 31 and 32 to reset the scaler 25 and the timer 23. At this time, the program control 19 also supplies a signal to a terminal 34 to signify that the sample in the detector should be changed.

Because the system shown diagrammatically in Fig. 5 may take any of a variety of forms known to those skilled in the art, it need not be illustrated or described in greater detail. It will be understood, however, that the "count" printed out by the printer 30 will include responses to background gamma radiation received by the crystal 14 from extraneous sources, in addition to the responses to radiation from the sample being measured. However, this "background count" can be first measured with no sample, or a sample of known radioactive strength in the detector. The background count can then be subtracted from each sample reading to arrive at an indication of the sample's radiation strength.

Besides counting the number of responses by the detector in a predetermined time interval, the time period required for the generation of a predetermined number of responses may be measured and recorded, as is well known. Either system provides an indication of the rate of gamma emission, and thus of radioactive strength.

In accordance with the invention, the relatively great number of samples 10 are stored and supported in an arcuate or circular array, with the center of the circle 10a on which they lie being coincident with the radiation detector 12. The samples are transferred one at a time to the detector for measurement, and then back to the storage support. The sequence of transferring a sample to the detector, counting its radiation during a predetermined time interval, returning it to the storage support, and then picking up the next sample for transfer to the detector, is automatically carried out.

As here shown in Figs. 1 and 2, the present apparatus comprises a base 35 made up of an annular top plate 36 and an apertured bottom plate 38 vertically spaced apart by a plurality of brackets 39. A circular sleeve 40 extends downwardly from the central opening in the top plate 36 to define a well in which the radiation detector 12 is supported with its axis 12a vertically oriented. The storage support for the several samples is in the form of an annular tray or turntable 41 which is disposed concentrically about the axis 12a. To afford rotation of the turntable about that axis, a plurality (here, three) of grooved rollers 42 extend from the brackets 39 and receive a rim 41a turned inwardly and downwardly from a vertical ring 41b forming a part of the turntable. Vertically spaced, horizontally extending flanges 41c, 41d and 41e extend from the ring 41b, the first two having a plurality of vertically alined holes therein forming receptacles 41f for receiving the samples 10. The lower ends of the samples 10 rest on the lowermost flange 41e, the three flanges thus forming a tray which may support a relatively large number (e.g., 100) of the samples 10 all disposed on the circle 10a concentric about the axis 12a of the radiation detector 12. Because the turntable 41 rotates about this same axis, each of the samples will remain at a constant distance from the scintillation crystal 14 regardless of the particular angular position of the turntable. As the turntable rotates, therefore, the background radiation received by the crystal 14 from any particular stored sample will remain substantially constant.

To transfer the samples 10 one at a time to the opening 14a in the detector crystal 14, a transfer arm 45 is mounted to swing about an axis 45a which is normal to the axis 12a, and disposed in between the radiation detector 12 and the circle 10a on which the stored samples lie. This transfer arm may swing between two limit positions extending to the right or to the left as illustrated by the solid and phantom lines in Fig. 2.

For picking up a sample as the arm begins movement from one limit position, and then releasing that sample when the arm reaches the opposite limit position, a pair of downwardly opening jaws 48 are pivotally connected to the transfer arm 45 in order that they will always depend in a vertical direction regardless of the particular position which the arm may occupy. As shown in Figs. 2 and 4, a pintle 49 is carried by the arm 45, and at its outer end pivotally supports the jaws 48.

These jaws 48 are biased toward one another, i.e., in a closed, sample-gripping direction, by a torsion spring 50. To open the jaws 48 as an incident to their reaching either of the two limit positions, a pair of abutments 51 and 52 are located respectively above the circle 10a on which the samples 10 lie and the detector 12. As the arm 45 swings to either of the limit positions, therefore, ears 48a formed integrally on the jaws 48 engage those abutments and spread the jaws open against the bias of the torsion spring 50. When the arm 45 begins to rise away from either limit position, however, the ears 48a are separated from the abutment 51 or 52, so that the spring 50 closes the gripping portions 48b of the jaws into firm engagement with the upper end of a sample 10.

Thus, it will be apparent that with the jaws 48 conditioned as shown in Fig. 4, they will close automatically to grip and lift the sample 10 as the arm 45 swings upwardly. When the arm 45 reaches its opposite limit position, the jaws 48 will automatically spread apart by engagement with the abutment 52, so that the sample previously picked up is released in the detector 12.

To permit adjustment of the points at which the jaws 48 open and close, the jaw-actuating abutments 51 and 52 are preferably formed as relatively long rods pivotally supported at 51a and 52a (Fig. 2), the height of the jaw-actuating surfaces being adjusted by the settings of screws 51b, 52b threadedly disposed in the abutments and resting on a base member 54.

To support the elongated samples 10, which are here illustrated as test tubes containing radioactive liquids, the holes or receptacles 41f in the turntable flanges 41c and 41d are only slightly larger than such test tubes. Also, the opening 14a in the detector crystal 14 is only slightly oversize with respect to the samples.

If the jaws 48 were pivotally attached directly to the transfer arm 45 any sample 10 carried in the jaws would be moved horizontally as well as vertically as it is raised out of or lowered into the closely fitting receptacles or crystal opening. This would tend to cock or skew the sample, causing binding and possibly breakage. In accordance with one feature of the invention, provision is made not only to assure that the samples 10 alway are disposed vertically during transferring motion, but also that they leave and enter the turntable or detector with a substantially straight line motion. As here illustrated, this is accomplished by a block 45b (Fig. 1) carried by and slidable longitudinally of the arm 45. The block is biased inwardly toward the axis 45a by a tension spring 56, and rigidly carries the pintle 49 which in turn pivotally supports the jaws 48 so that they always hang downwardly. A follower roller 60 carried by the block 45b is urged into engagement with a cam 61 by the spring 56. The cam 61 is formed with an arcuate surface 61a along its upper edge, but its side edges present substantially straight and vertical surfaces 61b, 61c. Since the cam 61 determines the displacement of the follower 60, block 45b and the pintle 49 from the axis 45a in all positions of the arm 45, the straight cam surfaces 61b and 61c result in the jaws 48 being lowered or raised in a straight vertical line as they approach or leave the two limit positions.

It will be apparent, therefore, that as the arm 45 swings counterclockwise from the outer limit position illustrated by solid lines in Fig. 2, the ears 48a (Fig. 4) on the jaws 48 first leave the abutment 51 so that the sample 10 disposed between the jaws is engaged by the gripping surfaces 48b. As the arm 45 continues to move in a counterclockwise direction, the jaws 48 move straight upwardly since the block 45b carrying the pintle 49 shifts inwardly and outwardly relative to the arm due to the action of the spring 56 urging the follower 60 against the cam surface 61a. After the lower end of the sample 10 has cleared the upper flange 41c of the turntable, the block 45b controlled in position of the follower 60 riding on the cam surface 61a moves laterally toward the detector 12, with the weight of the jaws and the gripped sample causing the latter to rock about the pintle 49 and always depend vertically downward, as shown by the dot-dash line illustration in Fig. 2. Then, as the follower 60 reaches the cam surface 61b, the block 45b and the jaws 48 cease to have a lateral component of motion, and are lowered straight down as the arm 45 reaches its inner limit position. Thus, the gripped sample 10 is lowered straight into the opening 14a of the crystal 14, and the ears 48a engage the abutment 52 to open the jaws 48, thus assuring that the sample 10 rests on the bottom of the opening 14a. After the radiation strength of the sample disposed in the crystal has been measured, the arm 45 may be swung clockwise back to its original position, the operation described above being repeated except that in this instance the sample is picked up from the detector 12 and returned to the turntable 41.

In order to enhance this movement of the sample into and out of the turntable and the detector, downwardly tapering stationary guides 65 are preferably disposed above the detector opening 14a and the turntable receptacle 41f which lies beneath the outer position of the jaws 48. These guides will engage and shift the lower ends of the samples 10 to assure that they properly enter the openings in the detector or turntable, even if the samples should, for some reason, become cocked or skewed within the jaws during travel from one postion to another.

The clockwise and counterclockwise swinging motion of the transfer arm 45 is produced by automatically controlled power means. For this purpose, a reversible arm motor AM having an integrally attached right-angle speed reduction gear box is fixed to the rear of the cam 61. The output shaft 62 of the arm motor lies on the axis 45a and rigidly carries the arm 45. Energization of the motor AM to turn the shaft 62 in one direction or the other will thus swing the arm from its inner to its outer limit position, or vice versa. To sense when the arm 45 has reached its inner and outer limit positions, and to assist in starting and stopping the motor AM, inner and outer limit switches are employed. As here shown, these take the form of inner and outer microswitches IMS and OMS which are suitably bolted to the rear surface of the cam 61 and provided with yieldable actuators 63 and 64 projecting through holes 61d and 61e cut in the cam. As the arm 45 reaches its inner or outer limit positions, it will respectively engage and deflect the actuators 63 or 64 to actuate the switches IMS or OMS. The control functions of these switches will be made clear below in connection with Fig. 6 which shows their contacts.

Once the transfer arm has returned a sample 10 to the turntable, the jaws 48 are opened automatically. To cause the jaws 48 to pick up a different sample 10 on the next cycle of movement of the arm 45, the arm and the turntable are angularly indexed relative to one another, so as to bring a different sample into the open jaws. In the present instance, the turntable 41, which is rotatable on the rollers 42, is rotated about the axis 12a through an angle sufficiently large to remove the previously released sample from between the opened jaws 48, and to bring the next sample in the turntable into those open jaws. For this purpose, the turntable 41 is adapted to be rotated by a table motor TM bolted to the underside of the base plate 36 and having an integral speed reducing gear with a downwardly depending output shaft 66. A collar 68 is non-rotatably fixed to the shaft 66 by a pin 69 extending through a vertical slot 70 in the shaft. This permits the collar 68 to shift longitudinally of the shaft 66, although it is urged downwardly by a compression spring 71.

Disposed on the underside of the collar 68 are two diametrically opposite, downwardly projecting pins 72 which are spaced to enter alternate ones of a plurality of slots 74 formed in a toothed ring 75 fixed to and extending inwardly from the lower edge of the turntable 41. As the shaft 66 rotates through successive half revolutions, one of the pins 72 enters a slot 74 in the toothed ring 75, and turns the turntable 41 through an angular increment which is sufficient to move the next sample 10 beneath the opened jaws 48.

In order to control the starting and stopping of the table motor TM so that it is energized only to move the table through one angular indexing increment, a control microswitch TMS is mounted adjacent the collar 68. Projecting from the collar 68 is a cam element 78 having two diametrically opposite cam members 79. Each time that the motor TM is energized, a yieldable actuator 80 for the table microswitch TMS will be released upon rotation of the cam element 78. When the collar 68 has rotated through one half revolution, the next cam member 79 will engage and deflect the actuator 80. This actuation of the switch TMS is utilized, as explained below, to de-energize the motor TM and thus bring the turntable 41 to a halt after it has moved through an angle sufficiently large to bring the next succeeding sample into a position between the opened jaws 48.

It may be required under some circumstances, that the turntable 41 be angularly moved or positioned manually. For example, when the turntable is first loaded with a plurality of samples, and it may be desired to establish the starting point of operation so that numbered samples are measured in sequence. In order to afford such manual rotation of the turntable 41, a release lever 82 is pivoted at 84 to the underside of the base plate 38, its left end being depressible in response to a downward force on a fingerpiece 85 (Fig. 1) which extends upwardly through a hole 85a in the upper base plate 36. Such rocking of the lever 82 raises its right end which as shown in Fig. 2 carries a projection 86 disposed beneath the collar 68 and cam element 78. Elevation of the projection 86 forces the collar 68 upwardly relative to the shaft 66, and against the bias of the spring 71. With this, the drive pins 72 are raised clear of the toothed ring 75, so that the turntable 41 may then be manually rotated to any angular position which may be desired. Release of the fingerpiece 85 reengages the drive pins 72 with the toothed ring 75.

Figure 6:
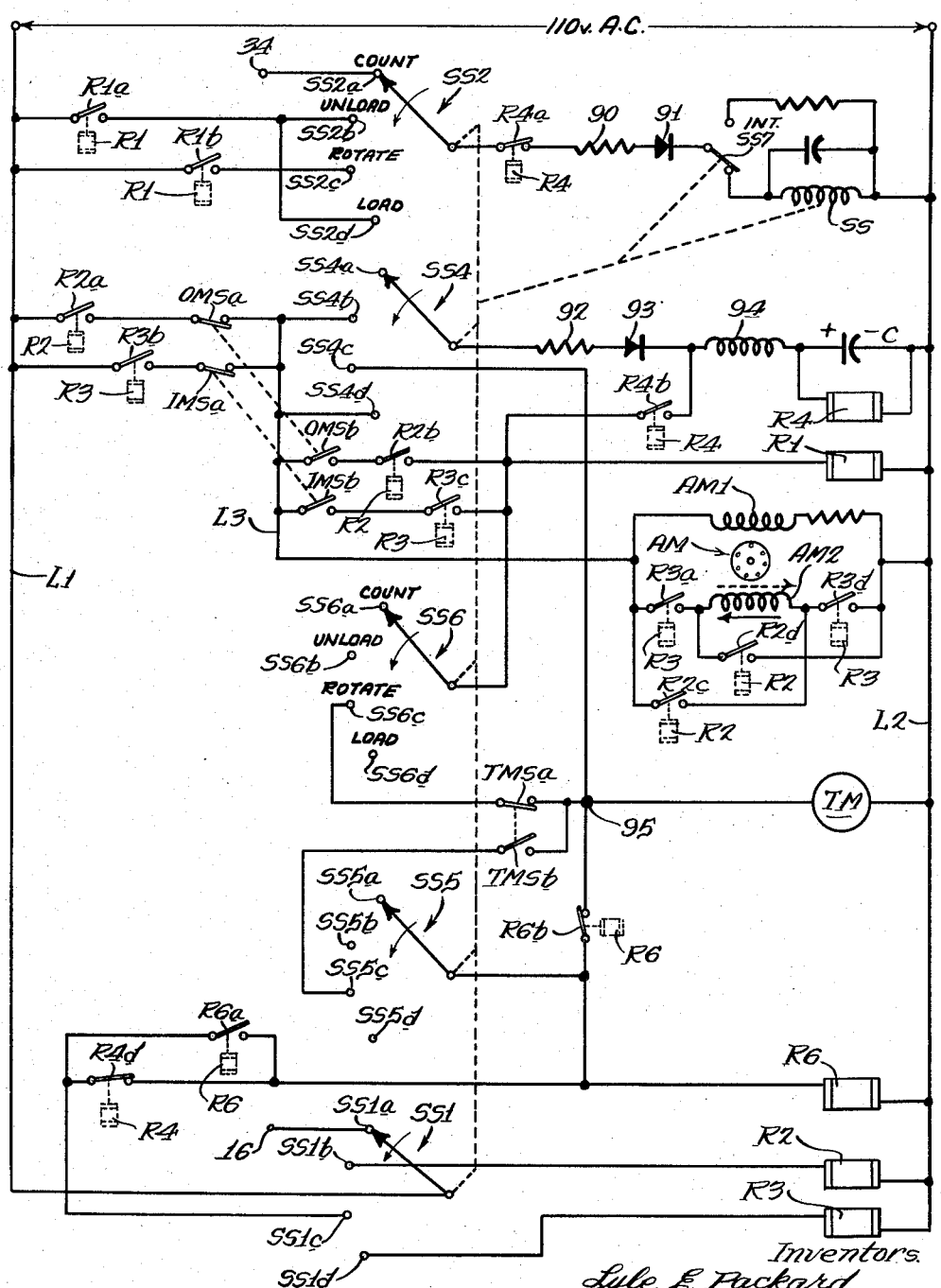
Fig. 6 is a schematic wiring diagram of electrical controls for the apparatus.

Exemplary controls for the apparatus thus far described are illustrated in Fig. 6. These include a stepping switch here illustrated as having a stepping solenoid SS which when energized causes a plurality of mechanically ganged wipers SS1, SS2, SS4, SS5 and SS6 to be stepped from one contact position to the next. The wipers have four positions which may be designated as the "count," "unload," "rotate" and "load" positions. With reference to the stepping switch wiper SS2, for example, it engages four electrical contacts SS2a, SS2b, SS2c and SS2d in response to the reception of four successive energizing signals by the stepping switch solenoid SS. One complete stepping cycle in the present instance requires but four energizations of the solenoid SS.

The organization of the controls may best be described by a narration of one complete cycle of operation. Let it be assumed that all of the stepping switch wipers are initially in the "home" position illustrated, i.e., engaging contacts SS1a, SS2a, SS4a, SS5a and SS6a, respectively. Assume also that a sample 10 is disposed in the detector crystal 14 and that the transfer arm 45 is in the "inner" limit position, i.e., with the open jaws 48 disposed above the detector 12 (Fig. 2). At this time, the arm motor AM and the table motor TM are both deenergized, with the inner microswitch IMS being actuated by the arm 45. The outer microswitch OMS is deactuated. The table microswitch TMS is in its "normal" condition, i.e., its contacts TMSa and TMSb being actuated and respectively closed and open, as illustrated in Fig. 6. All of the relays R1 through R6 in Fig. 6 are deenergized.

After radiation from the sample 10 in the detector has been counted for a predetermined time interval, and the printer 30 (Fig. 5) actuated to record the count of the scaler 25, the program control 19 supplies a "change sample" signal to the terminal 34. This has the effect of momentarily placing the terminal 34 in Fig. 6 at the potential of a voltage supply line L1, which along with a line L2 is connected to a suitable voltage source. Such signal supplied to the terminal 34 results in energization of the solenoid SS by current flow through the wiper SS2, normally closed relay contacts R4a, a resistor 90, a rectifier 91, and interrupter contacts SS7. This energization of the solenoid SS steps all of the wipers to their second or "unload" positions, and actuates interrupter contacts SS7 to deenergize the solenoid SS. By the time the interrupter contacts restore to the position illustrated, the wiper SS2 has moved to the contact SS2b.

As soon as the wipers move to their "unload" contacts, relay R2 picks up by current flow through wiper SS1. Accordingly, the relay contacts R2a close to connect an auxiliary line L3 to the line L1 through normally closed contacts OMSa of the outer microswitch OMS. With this, a first field AM1 for the arm motor AM is energized with alternating current. Also, with energization of the relay R2 and closure of relay contacts R2b and R2c, a second field AM2 is energized with alternating current of one phase polarity indicated by the solid arrow in Fig. 6.

Accordingly, the arm motor AM (here illustrated as a split phase induction motor) is energized and runs in a direction to swing the transfer arm 45 clockwise about the axis 45a (Fig. 2). The jaws 48 automatically engage the sample 10 disposed in the detector 12, lift the latter and move it back toward its receptacle in the turntable 41. While the motor AM is thus energized, a braking capacitor C is charged to a voltage of the polarity indicated (Fig. 6) by current flow from line L3 through the contact SS4b, wiper SS4, a resistor 92, a rectifier 93, and a non-linear inductance or choke 94. The relay R4 connected in parallel with the capacitor C is energized as the latter is charged. Thus, the contacts R4a open and the contacts R4b close. The latter contacts create an energization circuit to pick up the relay R1, and the contacts R1a, R1b thus close to prepare the circuit for the solenoid SS. As soon as the arm 45 begins this movement to "unload" the sample 10 from the detector 12, the inner microswitch IMS is deactuated since the arm 45 releases the actuator 63.

When the arm 45 reaches its second limit position, with the sample 10 having been returned to the turntable 41 and the jaws 48 automatically opened by engagement with the abutment 51, the actuator 64 for the outer microswitch OMS is depressed by the arm. The contacts OMSa (Fig. 6) open to isolate the line L3 from the line L1. The contacts OMSb close, so that the capacitor C now discharges by current flow through the choke 94, the now-closed contacts R4b, the closed contacts R2b, the contacts OMSb, and the motor fields, AM1 and AM2. Thus, in response to actuation of the outer microswitch OMS, the fields of the motor AM are not only disconnected from the alternating voltage source, but direct current is passed therethrough so as to dynamically brake the motor and bring it to a quick stop. This assures that the arm 45 stops quickly, without overtravel or undue stress on the jaws 48 and their cooperating abutment 51. Although the coils for relays R4 and R1 are in effect connected across the capacitor C, their resistance is so much greater than that of the motor fields AM1, AM2 that substantially all of the discharging current from the capacitor flows through those fields to create the dynamic braking action.

When the dynamic braking is substantially completed, i.e., the capacitor C is substantially discharged, the relay R4 drops out. Accordingly, the contacts R4a reclose so that the solenoid SS is again energized, this time by current flow through the closed contacts R1a, and the wiper SS2. Shortly after the relay R4 drops out, the relay R1 also drops out, but this action is delayed by the non-linear choke 94 which holds relay R1 energized until the solenoid SS has been energized through contacts R1a.

This second energization of the stepping switch SS causes the wipers to step to their "rotate" positions. With this, a relay R6 is energized by current flow through the wiper SS1 and its contact point SS1c, as well as the normally closed contacts R4d. The relay R6 seals in through its own contacts R6a. Just prior to pick-up and seal-in of the relay R6, however, current flows also through the contacts R4d and normally closed contacts R6b to one terminal of the table motor TM. This momentarily energizes the table motor and initiates rotation thereof.

As soon as the table motor starts, the table microswitch TMS is deactuated (i.e., its contacts TMSa and TMSb switched from the conditions illustrated in Fig. 6). Accordingly, current now flows through the wiper SS1, the contacts R6a, wiper SS5, and contacts TMSb to maintain the table motor energized. Current also flows from the left terminal 95 of the motor TM through the wiper SS4 and its contact point SS4c to again charge the capacitor C with a direct voltage of the polarity indicated. The charging of the capacitor C also results in energization of the relay R4, closure of the contacts R4b, and consequent pick-up of the relay R1. When the relay R4 picks up, its normally closed contacts R4a open before the contacts R1b close, so that solenoid SS is not energized. The circuit is conditioned to energize the solenoid SS when relay R4 next drops out.

When the turntable 41 has rotated through one angular increment to bring the next succeeding sample 10 into the open jaws 48, the table switch TMS is again actuated, reclosing the contacts TMSa and reopening the contacts TMSb. As a result, the table motor TM is deenergized, and the capacitor C begins discharging by current flow through the choke 94, the contacts R4b, the wiper SS6, and the contacts TMSa. Accordingly, this direct current flow through the table motor TM dynamically brakes the latter so that the table is quickly brought to a stop.

When the dynamic braking of the table motor has been substantially completed, the capacitor C will be discharged and the relay R4 will be deenergized. With this, the contacts R4a reclose to momentarily energize the stepping solenoid SS through the now closed contacts R1b and the wiper SS2. The relay R1 drops out a short instant thereafter, and the stepping switch SS is energized to move the wipers to the "load" positions.

When the wiper SS1b moves to the contact SS1d, the energization circuit for the relay R6 is broken and the latter relay drops out. Moreover, the relay R3 is picked up.

Pick-up of the relay R3 results in closure of its contacts R3b so that the line L3 is connected to the line L1 through the normally closed inner microswitch contacts TMSa. With this, the first arm motor field AM1 is energized as before. However, closure of the contacts R3a and R3d results in energization of the second motor field AM2 with an alternating voltage of opposite phase (indicated by the dashed arrow), so that the arm motor AM now turns in the opposite direction and drives the arm 45 in a counterclockwise direction. Thus, the jaws 48 automatically grip the sample 10 which has just previously been moved beneath them, lift that sample out of the turntable 41, and move it toward the detector 12.

During the interval that the arm motor fields AM1,

AM2 are thus energized, the capacitor C is again charged by current flow from the line L3 through the wiper SS4 and its contact point SS4d. When the capacitor is charged, the relay R4 again picks up, opening its contacts R4a. Moreover, the contacts R4b close so that the relay R1 is again energized.

When the transfer arm 45 reaches its inner limit position, the jaws 48 being automatically opened to release the new sample 10 in the detector 12, the inner microswitch IMS is actuated to open contacts IMSa and close contacts IMSb. Opening of contacts IMSa isolates the line L3 from the line L1, thereby deenergizing both motor fields AM1 and AM2. Closure of the contacts IMSb, however, permits the capacitor C to discharge by current flow through the contacts R4b, R3c, IMSb, and the two motor fields AM1 and AM2. This dynamically brakes the arm motor AM so that the latter brings the arm 45 to a quick, sure stop.

As the capacitor C becomes fully discharged, the relay R4 drops out, reclosing its contacts R4a. This energizes the solenoid SS through the now closed contacts R1a and the wiper SS2 engaged with its contact point SS2d. The wipers step to their "count" positions, and the relay R1 then drops out.

A second sample has now been placed in the detector 12. As the wiper SS1 reaches its "count" position in engagement with contact SS1a, it places a terminal 16 at the potential of the line L1. This constitutes a "sample ready" signal which in appearing on the terminal 16 causes the program control 19 (Fig. 5) to initiate the counting cycle of operation previously described in connection with Fig. 5. The response of the detector 12 is supplied to the scaler 25 for a predetermined time interval, and the reading is recorded by the printer 30. When this counting cycle is complete and the program control 19 supplies a "change sample" signal on its terminal 34, the cycle of operation described in connection with Fig. 6 will be repeated. In this manner, each of the plurality of samples 10 stored in the turntable 41 will be successively transferred to the detector 12, its radiation strength measured, and then returned to the turntable. After each sample has been measured and returned, the turntable is automatically angularly indexed so that the transfer mechanism can pick up the next succeeding sample and carry it to the detector.

Regardless of how thick and effective the sleeve 40 might be as a shield (and its size is limited by practical design considerations as to the space it may consume), the background radiation received by the detector from any given sample stored in a support would vary if relative movement of the support changed the spacing between that sample and the detector. The background radiation received from all stored samples could vary considerably as different ones of the samples were placed in the detector. With the present arrangement, the distance between any stored sample and the detector remains constant as the turntable rotates. Thus, the background radiation received by the detector when any sample is being measured will be substantially constant regardless of the angular position which the turntable may at that instant occupy. Because background radiation can be measured and subtracted from the readings of the samples, it does not introduce errors so long as it remains constant. That constancy of background radiation is here achieved.

Still another advantage of the present apparatus stems from the fact that the jaws 48 automatically grip and release the samples 10 when the latter are lifted from or returned to either the turntable or the detector. No special jaw-actuating power or mechanism is required. Tipping and possible spilling of liquid samples is precluded by a pivoted suspension of the jaws. Moreover, because the jaws 48 release the samples 10 after they have been inserted into the opening 14a of the detector crystal, the sample to be counted always rests on the bottom of that opening. The elevation of the sample with reference to the crystal is always exactly the same, and reproducible measurements of the same sample are obtainable.

Still further, the problem of lifting elongated samples free of and returning them to relatively closely fitting openings or receptacles in the detector crystal or turntable is here solved by a transfer mechanism which assures that these samples have a straight line vertical movement as they are being drawn from or returned to the opening or receptacle. The sliding block 45b in the arm 45 together with the cam 61 which controls its position are relatively simple structural components which provide a highly advantageous function.

The entire program of operation—which consists of transferring a sample from the table to the detector, measuring the radioactive strength of the sample, returning the sample to the turntable, and angularly indexing the turntable—is automatically carried out by the sequencing controls described in connection with Fig. 6. This control arrangement assures that the samples are reliably handled in sequence with the radiation strength of each being recorded by the printer 30 diagrammatically illustrated in Fig. 5. Indeed, it is possible to load the turntable with a large plurality of radioactive samples, set the apparatus in operation, and let it pursue its work automatically overnight or over a weekend. No operator need be in attendance.

Significant in the controls here described is the arrangement which provides for automatic dynamic braking of the two motors AM and TM so that they are brought to a quick stop after being deenergized. This is here accomplished by utilizing a single capacitor which is charged whenever either motor is energized, and then which supplies dynamic direction braking current to the motor when it is deenergized.

We claim as our invention:

1. In apparatus for measuring the radioactivity of samples, the combination comprising a storage support having means to hold a plurality of samples disposed in an arcuate array, a radiation detector mounted substantially at the center of the arc on which said samples are disposed, and means for transferring said samples one at a time from said support to said detector for measurement and then back to said support, whereby the background radiation received by said detector from stored samples remains substantially constant.

2. In apparatus for measuring the radioactivity of samples, the combination comprising a stationary radiation detector having an opening therein adapted to receive a sample, a storage support having means for holding a plurality of samples disposed in a circular array with the center of the circle coinciding with said detector, mechanism for transferring a sample from said support to said detector opening and back again, and means for relatively rotating said storage support and said mechanism through angular increments about said center so that different ones of said samples are placed successively in said detector.

3. In apparatus for measuring radioactivity of samples, the combination comprising means for supporting a plurality of samples disposed along a circle, means for rotating said supporting means through angular increments, a stationary radiation detector disposed at the center of said circle, and means for transferring a sample at a given angular point on said circle from said support to said detector for measurement and back again, so that angular indexing of said support causes said transferring means to move different ones of said samples successively to said detector, and the background radiation reaching said detector from stored samples remains substantially constant.

4. In apparatus for measuring radioactivity of samples, the combination comprising a stationary radiation detector having an opening therein adapted to receive a sample; a storage support for holding a plurality of samples disposed in a circular array; means mounting said support for rotation about an axis which is the center of said circular array and which is coincident with said opening; a transfer mechanism including means for picking up a sample disposed in said support on a given radial line relative to said center, means for placing said sample in said detector opening for measurement, and means for returning said sample to said support; and means for rotating said support through angular increments so that said transfer mechanism transfers and returns different ones of said samples in succession, whereby the background radiation to said detector from stored samples remains substantially constant as different ones of said samples are being measured.

5. In apparatus for measuring radioactivity of samples, the combination comprising a stationary radiation detector, an annular support disposed concentrically about said detector, and having means to hold a plurality of samples disposed in a circle, first means for transferring a sample from said support to said detector, second means responsive to complete operation of said first means for counting the response of said detector, third means responsive to completion of counting by said second means for transferring the sample from said detector back to said support, fourth means responsive to complete operation of said third means for angularly indexing said support, and means responsive to complete operation of said fourth means for initiating operation of said first means.

6. In apparatus for measuring radioactivity of samples, the combination comprising a stationary radiation detector, an annular support concentrically disposed about said detector and having means for supporting a plurality of samples circularly spaced therearound, a transfer arm pivoted to swing about an axis normal to the axis of said support and intermediate said detector and the circle on which said samples lie, a pair of jaws pivotally depending from said arm, means for opening and closing said jaws to release or grip a sample as an incident to said arm respectively reaching or leaving first or second limit positions.

7. The combination set forth in claim 6 further characterized in that said jaws straddle said circle when in the second limit position, and by means for angularly indexing said support about said support axis relative to said arm, so that said jaws can successively grip and transfer different ones of the samples.

8. In apparatus for measuring radioactivity of samples, the combination comprising a stationary radiation detector having a downward opening therein, an annular turntable having its axis coincident with the axis of said opening and having circularly spaced downward openings to receive and hold a plurality of samples, a transfer arm pivoted to swing about an axis normal to the turntable axis and disposed intermediate said detector opening and the circle on which said turntable openings lie, a pair of jaws pivotally depending from said arm to be moved with the latter between first and second limit positions respectively overlying said detector opening and the circle on which said turntable openings lie, means biasing said jaws closed, and stop members engageable by said jaws as they reach said limit positions for camming the latter open.

9. The combination set forth in claim 8 further characterized by means for swinging said arm from its second to its first position to transfer a sample from said turntable to said detector, means for then counting the output of said detector, means for next swinging said arm from its first to its second position to return the sample to the turntable, and means for angularly indexing said turntable to bring a different sample into registry with said jaws.

10. In apparatus for measuring radioactivity of samples, the combination comprising a stationary radiation detector having a downward opening in the top thereof, an annular turntable having its axis coincident with the axis of said detector opening and having a plurality of circularly spaced downwardly opening receptacles for receiving and supporting a plurality of samples, a transfer arm pivoted on a horizontal axis located between said opening and the circle defined by said receptacles, a pair of jaws pivotally depending from said arm, means biasing said jaws closed, means for moving said jaws substantially perfectly vertically toward or away from limit positions respectively overlying said opening or one of said receptacles in response to said arm swinging back and forth, and means opening said jaws against the said biasing means as they move into said limit positions.

11. In apparatus for measuring radioactivity of samples, the combination comprising a stationary radiation detector having a downward opening in the top thereof, an annular turntable having its axis coincident with the axis of said detector opening and having a plurality of circularly spaced downwardly opening receptacles for receiving and supporting a plurality of samples, a transfer arm pivoted on an axis normal to said turntable axis and intermediate the detector openings and the circle defined by said turntable openings, a block carried by and slidable along said arm, a pair of jaws pivotally depending from said block, means biasing said jaws closed, a cam disposed adjacent the plane of movement of said arm, a follower on said block and means urging it against said cam, said cam being shaped to locate said jaws in overlying registry with one of said turntable receptacles or with said detector opening when said arm is in first or second limit positions, respectively, and stop means for camming said jaws open as said jaws reach said first and second limit positions, said cam also being shaped to cause a sample gripped by said jaws to be raised or lowered linearly out of or into the detector opening and turntable receptacles as said arm leaves or reaches said first and second limit positions.

12. In a mechanism for transferring radioactive samples from receptacles of a tray to a radiation detector having a vertical opening therein, the combination comprising an arm pivoted to rock about a horizontal axis between first and second limit positions, a block carried by and slidable longitudinally of said arm, a pair of jaws pivotally depending from said block, means biasing said jaws closed, means including a cam engaged by a follower on said block for moving said jaws vertically and linearly toward or away from said opening and one of said receptacles as said arm approaches or leaves its limit positions, and abutments engageable by said jaws to open the latter as said arm approaches its limit positions.

13. In a mechanism for transferring radioactive samples from a storage support to a detector, the combination comprising a transfer arm and means to rock the same about an axis between first and limit positions, a pair of jaws, means for biasing said jaws closed, means attaching said jaws to said arm to register with and embrace samples in said detector and support when said arm is respectively in said first and second limit positions, and stationary abutments for engagement by said jaws to open the same as said arm reaches said first and second limit positions.

14. In a mechanism for transferring radioactive samples from a storage support to a detector, the combination comprising a transfer arm and means to rock the same about a horizontal axis between two limit positions, means for gripping and releasing samples, and horizontal pivot means connecting said gripping means to said arm so that a gripped sample always depends vertically as said arm swings from one limit position to another.

15. In a mechanism for transferring radioactive samples from a storage support to a detector, the combination comprising a transfer arm and means to rock the same about an axis between two limit positions, a block slidable longitudinally along said arm, a cam disposed parallel to the plane in which the arm moves, a follower on said block, means for biasing said follower against the edge of said cam, said cam having straight edge surfaces which are engaged by said follower when said arm is near its limit positions, and means carried by said block for gripping and releasing samples disposed in said support and detector when said arm is in different ones of its limit positions.

16. In apparatus for measuring the radioactivity of samples, the combination comprising a radiation detector, support means for holding a plurality of samples spaced on an arc having its center coincident with said detector, a pair of jaws movable between open and closed positions, means for transferring said jaws from a first position above said support means to a second position above said detector and back again, means for closing and opening said jaws as an incident to their moving out of or into said first position so that they respectively grip or release a sample alined therewith in the support means, and means for relatively indexing said jaws and support means to bring a different sample into alinement with the jaws.

17. The combination set forth in claim 16 further characterized in that the said means for closing and opening said jaws comprises spring means biasing the jaws closed and abutment means engaged by the jaws as they approach said first position for opening the jaws against the bias of said spring means.

18. The combination set forth in claim 16 further characterized by a pivotal connection between said transferring means and the upper portion of said jaws, so that the latter depend vertically downward under the influence of gravity during all movements of the former.

References Cited in the file of this patent

UNITED STATES PATENTS

| | | |
|---|---|---|
| Re. 18,133 | Westin | July 21, 1931 |
| 1,771,641 | Lamb | July 29, 1930 |
| 1,935,739 | Freese | Nov. 21, 1933 |
| 2,490,298 | Griorso | Dec. 6, 1949 |
| 2,500,492 | Henriques | Mar. 14, 1950 |
| 2,687,477 | Pfaff | Aug. 24, 1954 |
| 2,843,753 | Meeder | July 15, 1958 |
| 2,885,557 | Kizaur | May 5, 1959 |

OTHER REFERENCES

Peacock et al.: "An Automatic Sample Changer to be Used for Measuring Radioactive Samples," Review of Scientific Instruments, vol. 17, No. 7, pages 255 to 261, July 1946.